United States Patent [19]
Gressitt et al.

[11] 3,836,696
[45] Sept. 17, 1974

[54] CABLE TERMINAL

[75] Inventors: Tillman Johnson Gressitt, Long Valley; Peter Paul Koliss, Mendham, both of N.J.; Raymond Bolton Ramsey, Dunwoody, Ga.

[73] Assignee: Bell Telephone Laboratories, Incorporated, Murray Hill, N.J.

[22] Filed: Nov. 23, 1973

[21] Appl. No.: 418,197

[52] U.S. Cl. .................................. 174/41, 174/59
[51] Int. Cl. ....... H02g 15/10, H02g 7/06, H01r 9/00
[58] Field of Search ......... 174/40 R, 41, 44, 59, 60; 317/118

[56] References Cited
UNITED STATES PATENTS

| | | | |
|---|---|---|---|
| 1,862,811 | 6/1932 | Strong | 174/41 X |
| 2,126,891 | 8/1938 | Kelsay | 174/41 X |
| 2,891,101 | 6/1959 | Koliss | 174/59 |
| 3,153,693 | 10/1964 | Baxter et al. | 174/40 R |
| 3,701,835 | 10/1972 | Eisele et al. | 174/41 |

*Primary Examiner*—Laramie E. Askin
*Attorney, Agent, or Firm*—A. D. Hooper

[57] ABSTRACT

A cable terminal unit includes a housing having a door or cover hinged thereto by an integral hinge. A one-piece terminal panel mounts within the housing and divides it into a plurality of chambers including a cable splicing chamber which is covered by the panel and inaccessible when the panel is installed even when the door is open. Conductors of a stub cable are spliced to selected ones of the cable conductors within this chamber and are fastened to terminals which have one end extending from the panel into an accessible chamber. Thereafter service wires can be connected to the terminals without requiring access to the splicing chamber. Cable shield continuity across the terminal is provided by a flexible bonding system which allows substantial pullback of the cable sheath and shield within the terminal unit.

9 Claims, 5 Drawing Figures

CABLE TERMINAL

BACKGROUND OF THE INVENTION

1. Field of the Invention

This invention relates to apparatus for providing connections to the conductors of a multiconductor cable and more particularly to an aerial cable terminal having compartments therein segregating the operations related to the initial installation of the terminal and the subsequent connection of service wires to the cable conductors.

2. Discussion of the Prior Art

Aerial cable terminals have long been used for housing connections between customer service wires and selected conductors of aerial multiconductor cables. A commonly used terminal includes a base assembly having brackets thereon for suspending the terminal from the cable and rigid cable sheath clamps for providing electrical and mechanical continuity of the cable shield across the terminal. Terminal blocks can be mounted on the base and selected conductors in the cable can be connected thereto. Service wires are fed through grommeted openings in the base and connected to the terminal blocks and thereby to the selected conductors. A flexible plastic cover fits over the base assembly to shield the terminals and connections from the elements. One major disadvantage of this terminal is that all splices, connections and conductors therein are completely exposed when the cover is removed. Accordingly there is likelihood of damage to existing splices and connections and to nonselected or nonassigned conductors in the cable when subsequent customer connections are being made by relatively unskilled craftsmen. The so-called "rats' nest" created by having all splices, connections and conductors in a single compartment also increased the difficulty of identifying the desired conductors when subsequent connections or changes thereto were made. Another disadvantage of these terminals is that the rigid cable sheath clamps utilized cannot accommodate pullback of the cable sheath. Accordingly, shield continuity is often lost across the terminal. Still another disadvantage in these terminals is the relatively large numbers of separate parts therein which must be assembled by the craftsman on site. Another disadvantage is the lack of adequate sealing of the terminal unit to exclude moisture and vermin.

Attempts have been made to overcome the foregoing disadvantages. One such attempt is disclosed in U.S. Pat. NO. 3,701,835 which shows a terminal having an initial splicing compartment separated from a subsequent service wire connection compartment. However, these attempts have not completely overcome the disadvantages mentioned.

Accordingly it is an object of this invention to improve cable terminals for protecting nonassigned conductors and splices made during initial installation from damage during subsequent activity within the terminal.

Another object is to simplify cable terminals to eliminate loose parts required to be assembled on site.

Another object is to improve the ability of cable terminals to maintain cable shield continuity therethrough.

SUMMARY OF THE INVENTION

The foregoing objects and others are achieved in accordance with this invention by a terminal unit having two basic parts comprising a single piece housing with a lid or cover integrally hinged thereto and a terminal panel for mounting within the housing. The terminal panel segregates the housing into a plurality of compartments when installed therein. The terminal panel includes a stub cable which is wired or connected to the rear of terminals mounted on one section of the panel and extending into a first compartment.

In another compartment splices are made between the stub cable and selected conductors in the cable upon initial installation of the terminal and this compartment is thereafter covered and protected by the panel during subsequent entry into the terminal unit. The terminals extend through the panel into a third compartment where service wires entering the compartment through grommeted holes in the panel can be connected to the front thereof. The terminal panel includes conducting strips or brackets with bond clamps or shield connectors flexibly connected thereto for maintaining shield continuity across the terminal unit and vertically to the supporting strand, even when there is substantial sheath pullback. The panel also includes flexible boots or sleeves which fit over the cable at the entrance and exit to the terminal. The housing with an integral hinge provides a well sealed unit which excludes moisture and vermin.

BRIEF DESCRIPTION OF THE DRAWING

The invention will be more fully comprehended from the following detailed description and accompanying drawing in which.

DETAILED DESCRIPTION

Figure 1:
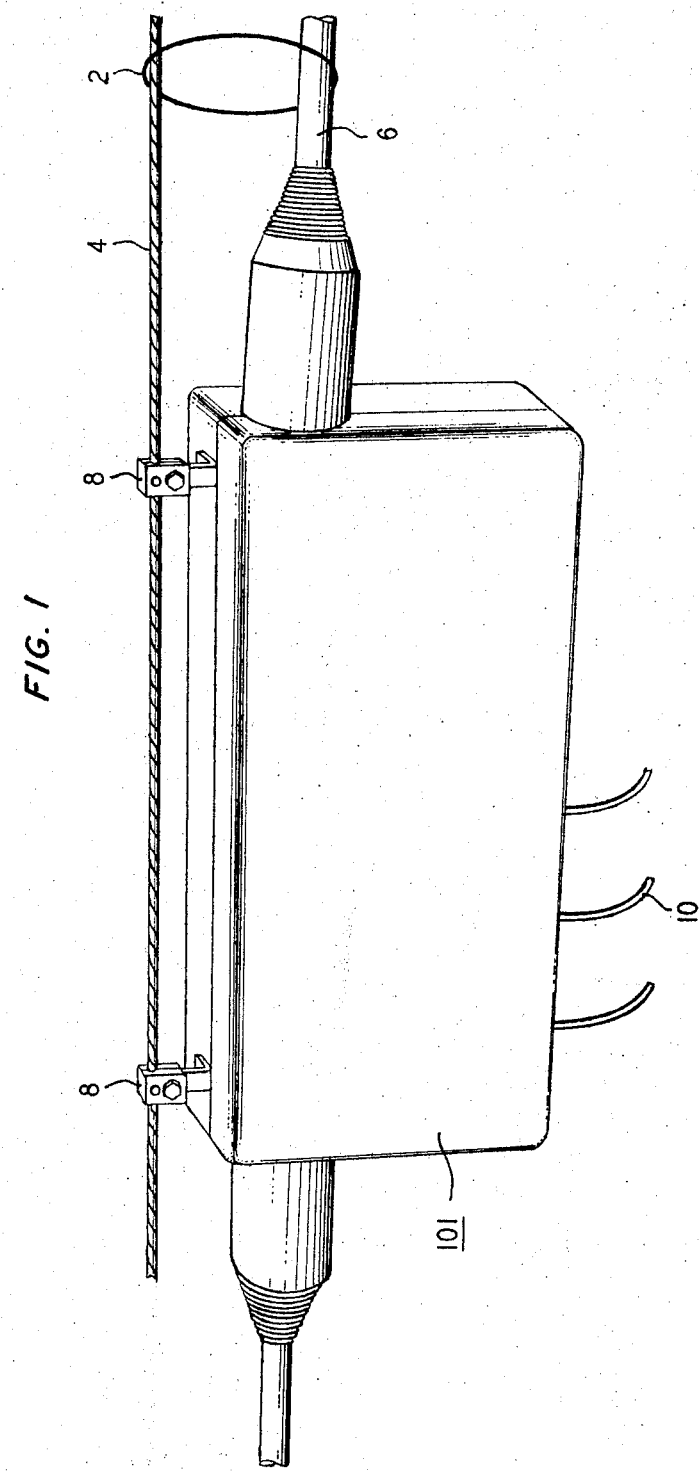
FIG. 1 is a perspective view of the terminal mounted on an aerial cable.

Referring now to FIG. 1 there is shown a terminal unit 101 in accordance with this invention mounted on an aerial cable 4. Terminal 101 is suspended from the support strand 4 of cable 4 by clamps 8 extending upward from the top of terminal 101. The signal carrying cable 6 or message portion of cable 2 the material, which is supported from aerial cable 4 by any conventional means denoted by the loop 2 in the drawing, passes through terminal 101 and selected conductors therein are connected within terminal 101 to drop or service wires 10 which enter terminal 101 from the bottom thereof.

Figure 2:
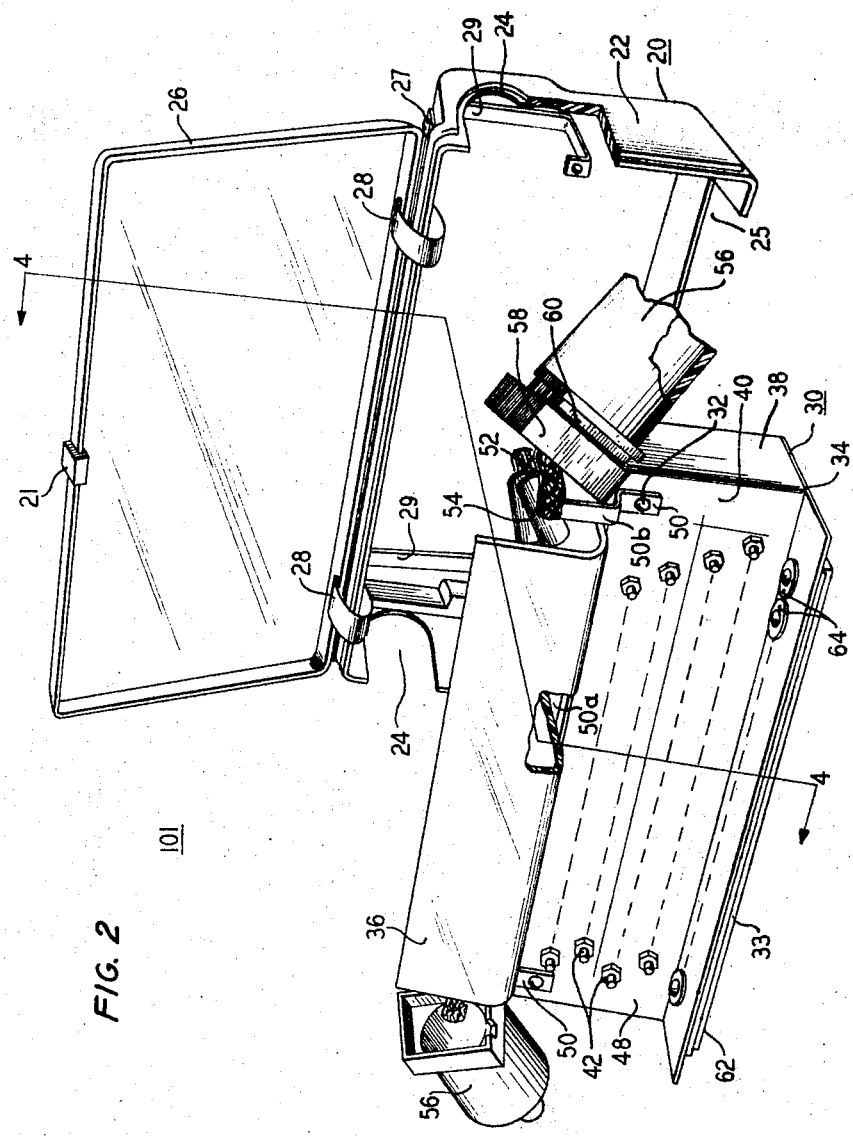
FIG. 2 is an exploded perspective view partly broken away of the terminal of FIG. 1 with the lid in the open position.

FIG. 2 shows terminal unit 101 in more detail. Terminal 101 includes only two basic subassemblies or parts which must be joined in the field. These parts comprise a housing 20 and a terminal panel or board 30.

Housing 20 comprises a box-like body 22 having cutouts 24 and 25 in the ends and bottom, respectively, thereof for reasons to be explained subsequently. A cover or door 26 is integrally formed on body 22 by an integral or living hinge 27. For example, body 22 and cover 26 can comprise a single-piece molding of relatively rigid plastic material such as polypropylene and hinge 27 can comprise a reduced thickness section of such molding which provides sufficient flexibility for a hinging action. Such an integral hinge would operate satisfactorily for the expected life of terminal 101. The one piece molding with an integral hinge ensures a good fit between body 22 and cover 26 which excludes moisture and vermin. This is especially important along the top of unit 101 where moisture tends to enter if there is any discontinuity between body 22 and cover 26. Double acting springs 28 advantageously can be placed about hinge 27 to hold cover 26 in either the open or closed position and prevent it from assuming other positions. Housing 20 also includes a pair of conductive mounting brackets 29 therein to which terminal panel 30 is mounted by bolts or screws 32 which extend therethrough to engage a threaded hole in brackets 29. Brackets 29 extend upward to the top of body 22 where they connect to respective support strand clamps 8 for purposes of providing cable shield continuity as will become clearer subsequently. Cover 26 includes thereon a lip or latch 21 which snaps over an edge 33 of terminal panel 30 to lock cover 26 in a closed position.

Terminal panel 30 comprises a single-piece, substantially I-shaped structure 34, having a flange 36 along the front edge of the top 37 thereof. Integral flanges 38 also extend back from the vertical leg 40 of the "I." For example, structure 34 can comprise a molding of relatively rigid plastic such as acrylonitrile-butadiene-styrene (ABS).

Figure 3:
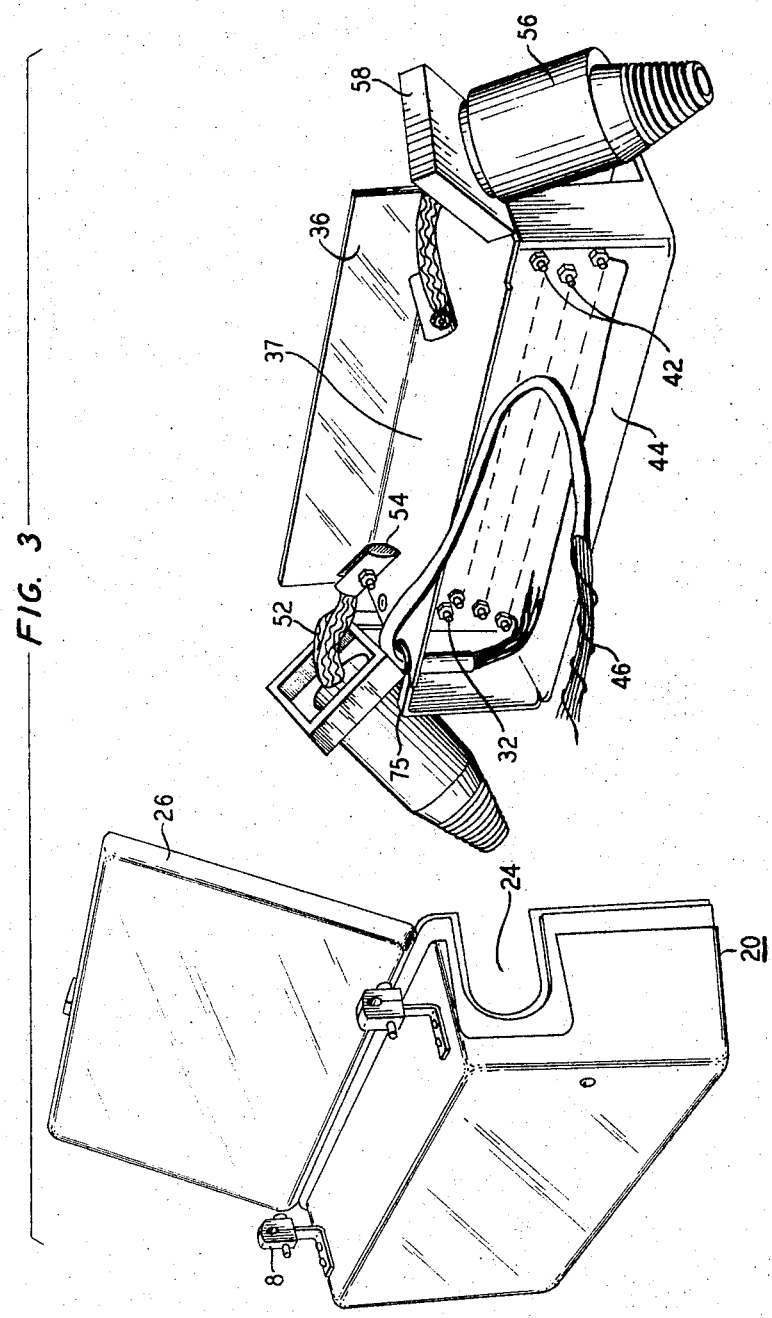
FIG. 3 is an exploded perspective view in the direction opposite to the view of FIG. 2.

A plurality of terminals 42 such as binding posts or numerous other connector devices known in the art are mounted on the leg 40 of structure 34 and extend from both sides thereof. As shown more clearly in FIG. 3, on the rear side 44 of leg 40 terminals 42 are connected to the conductors of a stub cable 46 which feeds upward through an opening 75 in top 37. Terminals 42 can be arranged in pairs corresponding with the tip and ring of a telephone line.

Along the front surface 48 of leg 40 is mounted a bracket 50 by the previously mentioned screws 32. Bracket 50 includes a conductive strap 50a extending along the bottom surface of top 37 from one end of panel 30 to the other. Bracket 50 extends around the front edge of top 37 and includes two ends 50b extending upward therefrom above top 37. A flexible braided cable 52 is connected to each end 50b of bracket 50 and has on the other end thereof a bond clamp or cable shield connector 54 such as that shown in U.S. Pat. No. 3,757,269 for maintaining cable shield continuity across cable splice points and terminals. When respective connectors 54 are connected to the cable shield on respective ends of terminal 101, shield-to-shield continuity is maintained across unit 101 through a conductive path comprising connector 54, braided cable 52, bracket 50, and cable 52 and connector 54 on the other end of bracket 50 to the cable shield. Shield-to-support strand continuity is provided through connector 54, braided cable 52, bracket 50, screw 32, bracket 29 and clamp 8 to strand 4. The braided cable 52 is initially installed in a folded configuration which can straighten out to accommodate as much as five inches of pullback of the cable sheath and shield without disrupting shield continuity.

Along the end edges of top 37 are mounted flexible sleeves or boots 56 through which the message cable or signal carrying part 6 of the cable 2 enters and exits terminal 101. Sleeves 56 advantageously are slit along the lower surface thereof to facilitate their placement over the cable. Sleeves 56 terminate on a relatively rigid base 58 having a groove 60 formed around the perimeter thereof. Base 58 is adapted for insertion in cutout 24 with groove 60 being engaged by the edges of cutout 24 to hold sleeve 56 in position thereon.

The bottom 62 of structure 34 fits within housing 22 so that it covers cutout 25. Bottom 62 includes a plurality of grommeted openings 64 therein through which service wires can enter and exit terminal 101. The grommeted openings 64 lie in front of the front surface 48 so that the entering service wires have immediate access to the front of terminals 42. A plurality of wire rings 66 are also attached to the outside of bottom 62 for use in forming drop loops for the service wires.

Figure 4:
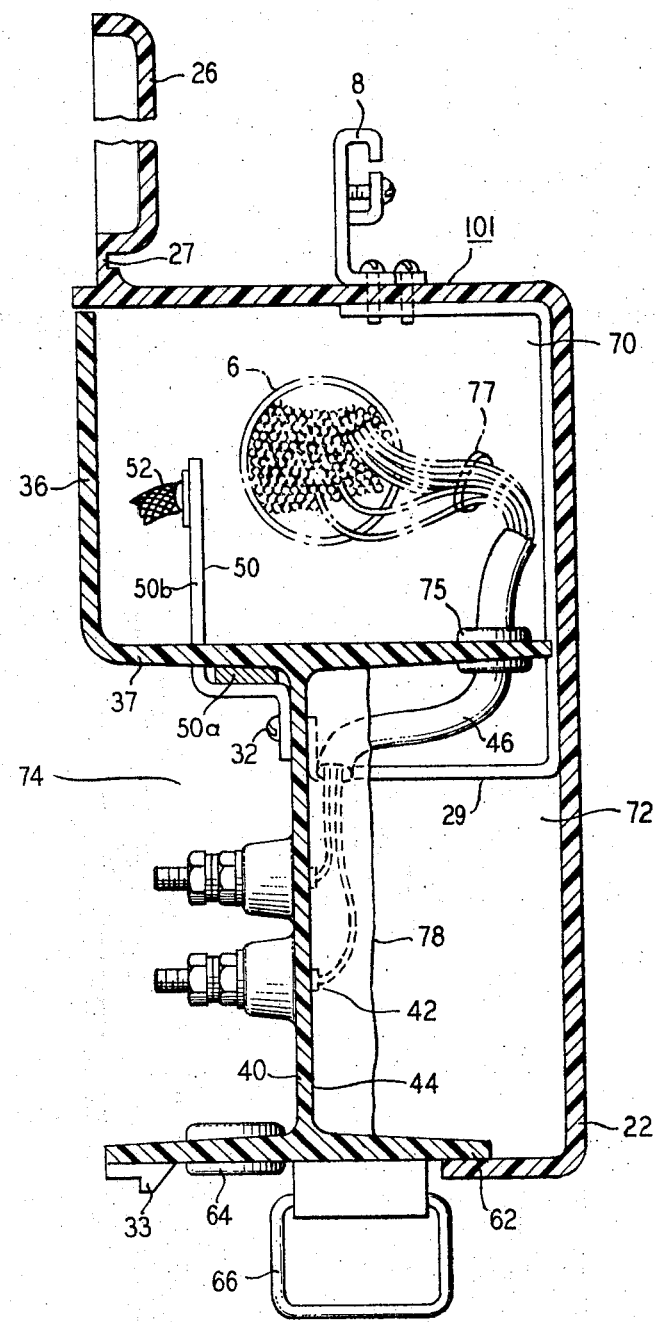
FIG. 4 is a schematic sectional representation substantially along lines 4—4 of FIG. 2.

When panel 30 is installed in housing 20, it divides the housing into three chambers or compartments, comprising an upper compartment 70, a lower rear compartment 72 and a lower front compartment 74, as indicated more clearly in the sectional view of FIG. 4. When terminal 101 is initially installed, all required connections to the selected conductors in the message cable 6 are made by a skilled craftsman splicing the conductors of stub cable 46 to the selected or assigned conductors of cable 6 in compartment 70. Subsequently when panel 30 is mounted within housing 20 by screws 32, it should be clear that the splices and remaining unassigned conductors in cable 6 within compartment 70 are completely covered and protected by upstanding flange 36. It should be apparent also that the connections between stub cable 46 and the rear of terminals 42 are also completely covered and protected within lower rear compartment 72 by vertical leg or wall 40. Accordingly, the likelihood of damaged to splices, conductors and other connections during subsequent entry of terminal 101 is greatly reduced. This arrangement simultaneously simplifies the working environment of any craftsman subsequently entering terminal 101. Such craftsmen can easily and quickly connect service wires to the front of any desired terminals 42 in lower front compartment 74 and thereby connect the service wire to any desired assigned conductor in cable 6. If desired, the lower rear compartment 72 can be filled with a known potting material to add further protection and strength to the connection therein.

Figure 5:
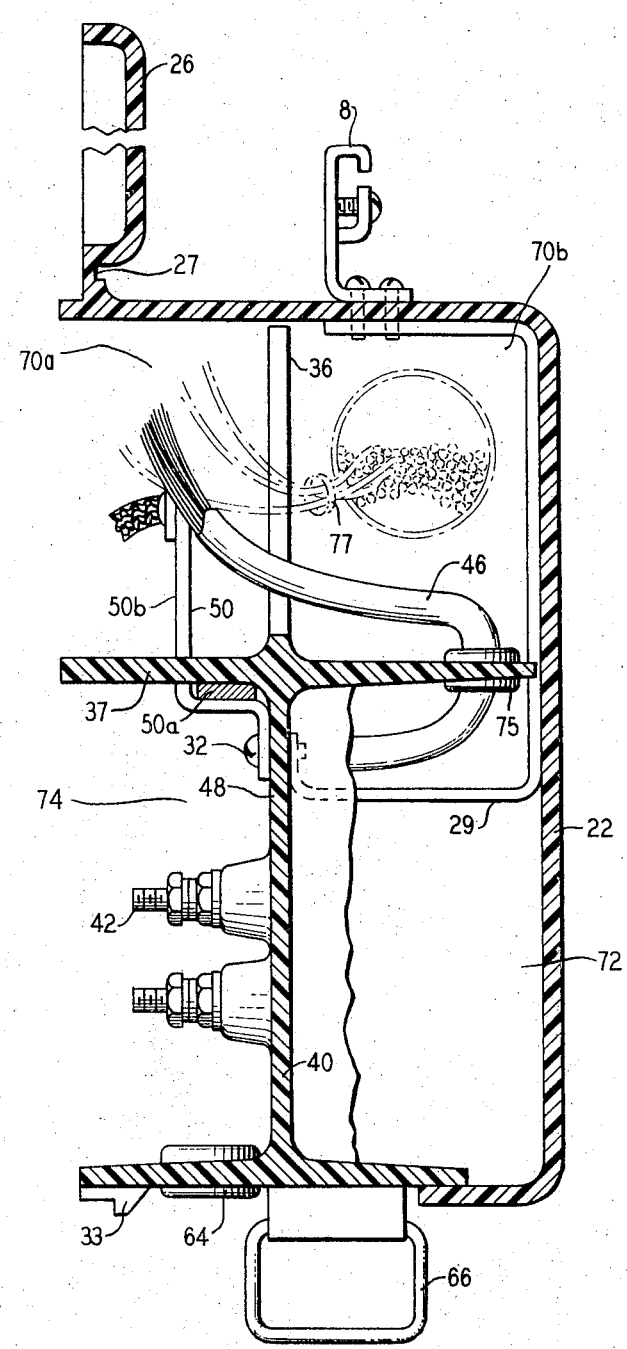
FIG. 5 is a schematic sectional representation similar to FIG. 4 of a second embodiment of the terminal.

The foregoing arrangement in which splices are initially made to all assigned conductors in cable 6 is termed a "fixed count" arrangement in the telephone industry. However, the apparatus of this invention can be readily modified to accommodate a "preferred count" arrangement where assigned conductors in cable 6 are segregated from the unassigned conductors, but where splices are made to the assigned conductors only as needed at a particular terminal unit and all the assigned conductors remain accessible for the making or changing of such splices as the need arises. A terminal unit for a preferred count arrangement is shown in section in FIG. 5. In this embodiment, the upstanding flange 36 is moved toward the center of top 37 so that it divides top compartment 70 into front and rear sub-compartments 70a and 70b, respectively. Cable 6 with the unassigned or express conductors remains covered and protected in rear subcompartment 70b as indicated in phantom. The assigned conductors 77 are broken out from cable 6 and along with stub cable 46 are routed around the front of flange 36 into subcompartment 70a where they remain available for making and changing splices therebetween without danger to the unassigned conductors or terminal connections in compartments 70b and 72, respectively.

As previously indicated, terminal 101 includes only two major parts, i.e., housing 20 and panel 30. Each of these parts can be completely fabricated in the factory using low cost production techniques such as plastic molding. These parts can be quickly mated in the field to provide a terminal unit providing protection of splices and existing connections during subsequent work within the terminal. These features of simplicity, economy and reliability of operation are distinct advantages.

While the invention has been described with reference to specific embodiments thereof, it is to be understood that various modifications thereto might be made without departing from the spirit and scope of the following claims.

What is claimed is:

1. A cable terminal unit providing for connections of external conductors to selected conductors within a multiconductor cable having an electrical shield therein without direct access to said cable after the installation of said terminal unit comprising, in combination:
    a housing adapted for installation about said cable and including a cover integrally formed with said housing and providing access thereto; and
    a panel member mounted in said housing and dividing said housing into at least two compartments one of which is accessible and the other of which is inaccessible when said cover is in an open position, said other compartment being adapted to receive said cable therein,
    said panel member including a first wall having terminals with first and second ends mounted therein with said first ends extending into said one compartment so that said external conductors can be mounted thereon, a stub cable having conductors therein forming connections with said second ends and adapted to connect said second ends with said selected conductors in said other compartment, flexible sleeves on respective ends of said panel member adapted to fit about said cable and provide entry means therefor into said other compartment, and cable shield connector means on respective ends of said panel member adapted to connect to said cable shield to provide continuity of said shield through said unit, said connector means including a flexible conductor for allowing movement of said shield with respect to said unit without degradation of the connection thereto.

2. Apparatus in accordance with claim 1 wherein said panel member divides said housing into three compartments comprising a first compartment having said first ends of said terminals extending therein, a second compartment adapted to receive said cable, and a third compartment having said second ends of said terminals extending therein, said third compartment being inaccessible when said cover is in said open position, so that said connections between said stub cable and said second ends are protected, said stub cable extending from said third compartment into said second compartment for connection to said selected conductors in said second compartment.

3. Apparatus in accordance with claim 2 including a layer of potting material covering said connections between said stub cable and said second ends of said terminals in said third compartment.

4. Apparatus in accordance with claim 1 wherein said housing includes a cutout in the bottom surface thereof, and said panel member includes a flange covering and closing said cutout, said flange includes a plurality of grommeted openings therethrough for providing entry of said external conductors into said first compartment.

5. Apparatus in accordance with claim 1 wherein said panel member divides said housing into four compartments comprising a first compartment having said first ends of said terminals extending therein, a second compartment adapted to receive said cable, a third compartment having said second ends of said terminals extending therein, and a fourth compartment adapted to receive said selected conductors, said second compartment being adapted to have said selected conductors separated from said cable therein and routed to said fourth compartment, said stub cable extending from said third compartment into said fourth compartment for connection to said selected conductors therein, said first and fourth compartments being accessible and said second and third compartments being inaccessible when said cover is in said open position whereby said connections can be made to said selected conductors without access to said cable.

6. Apparatus in accordance with claim 1 including clamp means for suspending said terminal unit from the support strand of an aerial cable, a bracket within said housing which is connected to said clamp means, said panel member being mounted to said bracket, and said cable shield connector means is connected to said bracket whereby continuity of said shield is provided to said support strand.

7. Apparatus in accordance with claim 1 wherein said panel member comprises a substantially I-shaped member having a first vertical wall and top and bottom horizontal walls disposed along the top and bottom edges, respectively, of said first vertical wall, and a second vertical wall extending upward from said top horizontal wall, each of said walls having a length extending substantially the full length of said housing, said first and second vertical walls having a combined height extending substantially the full height of said housing, said terminals are mounted in said first vertical wall to extend from both major surfaces thereof, and said bottom horizontal wall includes a plurality of grommeted openings therein through which said external conductors can enter said unit.

8. Apparatus in accordance with claim 7 wherein said top horizontal wall has a width extending substantially the full depth of said housing, said first vertical wall contacts said top horizontal wall along substantially the center of a major surface thereof, and said second vertical wall extends upward from the front edge of said top horizontal wall so that said housing is divided into three compartments, one of said compartments containing said first ends of said terminals being accessible and the other two of said compartments respectively adapted to receive said cable and containing said second ends of said terminals being inaccessible when said cover is in said open position.

9. Apparatus in accordance with claim 7 wherein said top horizontal wall has a width extending substantially the full depth of said housing and said first and second vertical walls contact said top horizontal wall substantially along the centers of major surfaces thereof so that said housing is divided into four compartments, first and fourth ones of said compartments containing said first ends of said terminals and adapted to receive said selected conductors, respectively, second and third ones of said compartments adapted to receive said cable and containing said second ends of said terminals, respectively, said first and fourth ones of said compartments being accessible and said second and third ones of said compartments being inaccessible when said cover is in said open position.

* * * * *

UNITED STATES PATENT OFFICE
CERTIFICATE OF CORRECTION

Patent No. 3,836,696　　　　　　Dated September 17, 1974

Inventor(s) Tillman J. Gressitt-Peter P. Koliss-Raymond B. Ramsey

It is certified that error appears in the above-identified patent and that said Letters Patent are hereby corrected as shown below:

Col. 2, line 52, after "cable" delete "4" and insert --2--;

line 53, after "cable" delete "4" and insert --2--;

line 55, delete "the material";

lines 56 and 57, delete in its entirety.

Col. 4, line 21, delete "drop" and insert --drip--.

Signed and sealed this 24th day of December 1974.

(SEAL)
Attest:

McCOY M. GIBSON JR.
Attesting Officer

C. MARSHALL DANN
Commissioner of Patents